United States Patent Office 3,385,833
Patented May 28, 1968

3,385,833
PROCESS FOR PREPARING POLYURETHANES
Rudolph Pariser, Hockessin, and William K. Witsiepe, Wilmington, Del., assignors to E. I. du Pont de Nemours and Company, Wilmington, Del., a corporation of Delaware
No Drawing. Filed Jan. 8, 1965, Ser. No. 424,183
6 Claims. (Cl. 260—77.5)

ABSTRACT OF THE DISCLOSURE

A process for preparing a polyurethane poylmer from (a) a bischloroformate of a polyalkyleneether glycol, (b) a bischloroformate of a low molecular weight polyol, and (c) an organic secondary diamine, said bischloroformates and diamine being employed in the proportions of about 1.0–1.1 moles of diamine per mole of bischloroformate, which comprises (1) reacting about 1 mole of one of the bischloroformates (a) or (b) with from about 1 to 2 moles of said diamine, followed by (2) reacting the prepolymer resulting from step (1) with the other bischloroformate and the remaining portion of the diamine.

---

This invention relates to novel polyurethane polymers and more particularly to an improved process for preparing thermoplastic polyurethane polymers, which polymers have an ordered distribution of polymeric segments.

Injection and compression molding techniques are well known for the economical and rapid production of a variety of plastic items. These molding techniques are generally not applicable to the production of elastomeric parts because conventional elastomers are cross-linked and therefore not thermoplastic; however, a few thermoplastic elastomers are known. U.S. Patent No. 2,929,802, describes polyurethane polymers derived from diamines and the mixed bishaloformates of a high molecular weight polyether glycol and a low molecular weight glycol. The diamine and low molecular weight glygol used for preparing these polyurethanes must be selected so that the polyurethane formed from them in the absence of the polyether glycol, has a melting point of 175° C. or above. While some of the polymers disclosed in this patent may be extruded or even injection molded, they are primarily intended for preparing elastic filaments. Thermoplastic polyurethane polymers intended for injection molding must have thermal stability, processability, a number of properties such as resistance to compression set, which is most important, and/or retention of strength at elevated temperatures. Thus the problem is one of achieving a desirable balance between thermal stability, processability, and physical properties, all of which are essential to the utility of a thermoplastic elastomer.

In general, the polyurethane polymers which have been described in the prior art are based on "soft" segments derived from polyether glycols, and "hard" segments derived from short-chain glycols, by reactions of appropriate bishaloformates and appropriate diamines to provide various modifications of properties. While the prior art mentions the effect on certain physical properties of distributing hard and soft segments in the polyurethanes, the method for their preparation is to select appropriate types and concentrations of intermediates and react them by conventional processes.

It is an object of the present invention to provide novel thermoplastic polyurethane polymers. A further object is to provide an improved process for preparing these polyurethane polymers whereby there is an ordered distribution of polymeric segments in the polymer. A still further object is to provide a process for preparing improved thermoplastic polyurethane polymers which are highly useful for injection and compression molding techniques and which exhibit physical properties, more particularly, compression set, unexpectedly superior to polyurethane polymers prepared by conventional processes from identical intermediates. Other objects will appear hereinafter.

These and other objects of this invention are accomplished by providing an improvement in the process for preparing a thermoplastic polyurethane polymer from a bischloroformate of a polyalkyleneether glycol, which glycol has a molecular weight between about 1000 and 2000, a bischloroformate of a low molecular weight glycol, with this glycol having a molecular weight below about 200, and from 1 to 1.1 equivalents per equivalent of said bischloroformates of an organic secondary diamine, with the bischloroformate of said polyalkyleneether glycol being used in a molar ratio with the bischloroformate of said low molecular weight glycol of from about 1:3 to about 1:0.5. More particularly, this invention is concerned with an improvement which involves reacting about 1 mole of the bischloroformate of the polyalkyleneether glycol or the bischloroformate of the low molecular weight glycol with from about 1 to 2 moles of the organic secondary diamine. The diamines which are used are piperazine and 2,5-dimethyl-piperazine. The polymer resulting from this reaction is then reacted with the bischloroformate of the low molecular weight glycol or, if this bischloroformate was used in the first step, the bischloroformate of the polyalkyleneether glycol is used and this is followed by using the remaining portion of the stoichiometric amount of the diamine.

It has been found that the improved process of the present invention provides thermoplastic polyurethane polymers which have an ordered relationship between structural units, resulting in an unexpected improvement in physical properties such as high temperature strength and resistance to compression set which are outstandingly better than the properties shown by the polymers obtained from similar intermediates using conventional processes, i.e. reaction of the diamine with a mixture of the glycol bischloroformates. It is now possible to make thermoplastic polyurethane polymers with excellent strength and elastomeric properties from relatively inexpensive intermediates. Previously, thermoplastic polymers made by the conventional processes required complex combinations of both type and proportions of intermediates to provide the desirable distribution of segments. Frequently, expensive intermediates, such as diacid halides, were used together with the diamines and the bischloroformates of various glycols to provide polymers with the properties which are now obtained without the diacid halides from the improved process of this invention.

The thermoplastic polyurethane polymers prepared by the improved process of this invention, while soluble in many solvents, show the usual characteristics of conventional reinforced, cross-linked elastomers. The solubility behavior indicates that the polymers are linear, but their properties suggest that they are reinforced by strong physical forces. In the present polyurethane polymers, these physical bonds can be ruptured reversibly by heat at temperatures below those at which the polymer degrades chemically. At temperatures below those where the physical bonds are ruptured, physical bonding is re-established to varying degrees, and at normal temperatures the typical characteristics of conventional elastomers are re-established fully.

The novel thermoplastic polyurethane polymers of this invention contain structural units which are derived from the three intermediates. These structural units are connected in head-to-tail fashion and may be represented by formulae:

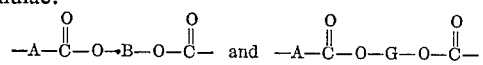

wherein —A— is a bivalent radical containing terminal nitrogen atoms, —B— is the residue remaining after removal of the hydroxyl groups from the glycol having a molecular weight below about 200 and —G— is the residue remaining after removal of the hydroxyl groups from the polyalkyleneether glycol. Since a secondary diamine is being used, there are no hydrogen atoms on the terminal nitrogen atoms of the bivalent —A— radical. The organic secondary diamines which are used in the present invention include piperazine and 2,5-dimethylpiperazine. Mixtures of these diamines may also be used.

The structural unit referred to as —B— is the residue remaining after removal of the terminal hydroxyl groups from a glycol having a molecular weight below 200. The glycols which may be used to provide this structural unit should contain two aliphatic hydroxyl groups, which may be primary, secondary or tertiary. The bivalent radical —B— may be substituted with groups which do not interfere with the preparation of use of the polymers. Examples of such groups include alkyl, aryl, alkoxy, aryloxy, and alkenyl groups. Glycols in which the bivalent radical —B— is aliphatic, cycloaliphatic, or aliphatic-aromatic may be used as long as both hydroxyl groups are connected to aliphatic carbon atoms. Specific examples of suitable glycols include ethylene glycol, 1,2-propylene glycol, neopentyl glycol, 1,3-butanediol, 1,4-butanediol, 1,5-pentanediol, 2-methyl-1,4-butanediol, 2-ethyl-2-methyl-1,3-propanediol, 2-butyl-2-methyl-1,3-propanediol, 2-allyloxy methyl-2-methyl-1,3-propanediol, cyclohexanediol, and diethyleneglycol. Of these 1,4-butanediol and neopentyl glycol are especially preferred. Mixtures of the glycols may also be used advantageously on occasion.

The structural unit referred to as —G— is the residue remaining after removal of the terminal hydroxyl groups from a polyalkyleneether glycol having a number average molecular weight from about 1000 to about 2000. These polyalkyleneether glycols may be represented by the formula $HO(RO)_nH$, where R is an alkylene radical which may be the same or different, and $n$ is an integer sufficiently large that the glycol has a number average molecular weight in the specified range. Representative glycols include polypropyleneether glycol, polytetramethleneether glycol, polydecamethyleneether glycol, etc.

The thermoplastic polyurethanes formed by the improved process of this invention consist essentially of "hard" segments derived from a urethane prepared from at least two complementary monomers capable of forming a polymer with a melt temperature above about 175° C., connected to "soft" segments derived from the polyalkyleneether glycol.

The conventional processes for preparing polyurethanes consist of reacting aqueous and/or solvent mixtures of bischloroformates of the glycols which contribute to the hard and soft segments of the polymer, with the monomeric diamines, by combining the reactants together in a vessel with a suitable acid acceptor such as sodium carbonate, and isolating the product formed by the reaction. These processes are described in U.S. Patent 2,929,802.

In the first step of the improved process of the invention, a mole of the bischloroformate of the polyalkyleneether glycol, which contributes to the soft segment of the elastomer, is separately reacted with from about 1 to about 2 moles of secondary diamine. The preferred molar ratio of the glycol bischoloformate to diamine is 1:1.5 to 1:1.75. In this step, it is preferable to omit any inorganic acid acceptors such as sodium hydroxide, or sodium carbonate, but they may be added, provided the amount of inorganic acid acceptor is less than the amount of secondary diamine, and the sum of the two is less than 2 equivalents of base for reaction with the one mole of polyalkyleneether glycol bischloroformate.

In the next step of the process, the bischolorformate of the low molecular weight glycol which contributes to the hard segment of the elastomer is added and reacted with the remaining stoichiometric amount of the diamine necessary for the final polyurethane composition, in the presence of an excess of a conventional acid acceptor such as sodium carbonate. The polymer thus formed is isolated by methods similar to those used in conventional processes.

It is not mandatory that the bischoloroformate of the polyalkyleneether glycol be first reacted with the secondary diamine, followed by adding the bischolorformate of the low molecular weight glycol and any remaining diamine, although this method is preferred. An alternate procedure, which also produces distributions of segments which result in the improved properties desired in these polyurethanes is to react one mole of the bischloroformate of the low molecular weight glycol with from about 1 to about 2 moles of the secondary diamine. The preferred molar ratio of the low molecular weight glycol bischloroformate to secondary diamine is 1:1.5 to 1:1.75. In this alternate procedure for the first step reaction, it is preferable to omit any inorganic acid acceptors such as sodium hydroxide or sodium carbonate, but they may be added, provided the amount of inorganic acid acceptor is less than the amount of secondary diamine, and the sum of two is less than 2 equivalents of base for reaction with the one mole of low molecular weight glycol bischloroformate. In the next step of the alternate procedure, the bischloroformate of the polyalkyleneether glycol is added, and reacted with the remaining stoichiometric amount of secondary diamine necessary for the final polyurethane composition, in the presence of an excess of a conventional acid acceptor such as sodium carbonate. The polymer thus formed is isolated by methods similar to those used in conventional processes.

It is preferred to react the polyalkyleneether glycol bischloroformate and the initial portion of the diamine completely separately from the low molecular weight glycol bischloroformate. However, as much as 40% of the low molecular weight glycol bischloroformate can be blended with the polyalkyleneether glycol bischloroformate, and reacted with the initial portion of the diamine in the first step to obtain distributions of segments which result in the improved properties. The over-all ratio of polyalkyleneether glycol bischloroformate to low molecular weight glycol bischloroformate should range from about 1:3 to about 1:0.5.

The improved process of the present invention may be operated most conveniently under conditions which may be described as solution/interfacial polymerization. The bischloroformate of the polyalkyleneether glycol is dissolved in an inert water-immiscible solvent, t oabout a 10% concentration. The solvent selected should be capable of dissolving the polymeric reaction product, and should not react at an appreciable rate with the reactants. It is also desirable to select a low boiling solvent to facilitate isolation of the polymer. Halogenated aliphatic hydrocarbon solvents have been found particularly useful for this purpose, preferably those containing bromine or chlorine. Preferred solvents include methylene chloride, chloroform, 1,1,2-trichloroethane, and 1,1,2,2-tetrachloroethane. The appropriate amount of the diamine is then reacted with the bischloroformate of the polyalkyleneether glycol. The diamine can be added as as a finely divided solid, or as a slurry or as a solution in the same solvent in which the bischloroformate of the polyalkyleneether glycol is dissolved, or as an aqueous solution. Whether added as a slurry or as a solution, the preferred concentration of diamine is in the range of 8–20 weight percent. solved in an inert water-immiscible solvent, to about a The bischloroformate of the low molecular weight glycol is added to the above reaction mixture either undiluted or dissolved preferably in the same water-immiscible solvent as that used for the bischloroformate of the polyalkyleneether glycol. After the bischloroformate of the low molecular weight glycol is mixed with the bischloroformate of the polyalkyleneether glycol, the balance of the diamine and the acid acceptor is added to complete the polymerization. Preferably in this step the diamine and acid acceptor are added in an aqueous solution. Concentration of these reactants is not critical within the range of about 8 to 20 weight percent, which is preferred for convenience in handling. The aqueous solution of acid acceptor which is added during the polymerization is necessary for reaction with hydrogen halide acid which is formed as a by-product. As previously mentioned, sodium carbonate is a preferred acid acceptor, but others which are suitable include sodium hydroxide, sodium bicarbonate, and potassium bicarbonate. When the process of the present invention is operated, the term "essentially stoichiometric" applied to the amount of diamine may include an excess of about 1% to about 10% of that calculated for complete reaction with the glycol bischloroformates.

The improved solution interfacial polymerization process of this invention can be performed batchwise or continuously. In a typical bath process, the various solutions previously described are reacted in a vessel equipped for vigorous shearing agitation, for example a Waring Blendor. The initial reaction step may be started at room temperature and should be preformed as rapidly as possible without causing the reaction mass to boil over. The reactions during this step are generally less exothermic than those resulting from the conventional process, and about one minute for the reaction is adequate. During the final polymerization where the acid acceptor is added, the temperature may rise, but will not exceed the boiling point of the solvent, as long as solvent may evaporate. After all the polymerization ingredients have been added, the reaction is usually complete within about 4 to 20 minutes.

Following reaction, the polymer may be isolated by removing the solvent via distillation, then filtering and washing to remove salts. Vigorous agitation is desirable during solvent removal, because this facilitates the formation of small particles of polymer which are generally preferred to the large bulky masses formed with poor agitation. The isolated polymer may be dried in an air or vacuum oven.

It is desirable to add antioxidants to the polyurethanes prepared by the improved process of the invention. Useful antioxidants include 2,2'-methylenebis(4-methyl-6-tertiary-butyl phenol), symmetrical di-B-naphthyl-p-phenylene diamine, and 4,4' - butylidenebis(3 - methyl-6-tertiary-butyl phenol). They are preferably added at levels ranging from about ½ to 2% based on the deight of the polymer. It is preferred to add the antioxidant to the polymer slurry resulting from the steam distillation of the solvent, prior to washing and drying.

The highly modified polyurethanes produced by the improved proceess of this invention have many uses. As shown in the examples, they have an over-all balance of physical properties and particularly resistance to compression set, which are markedly superior to those obtained by use of the conventional processes. Thus, these polymers are more desirable for compression or injection molding of a variety of precision molded elastomeric parts. They are especially suited for moldng mechanical forms such as gears, gaskets and belts. They are also suited for use in blow molding, transfer molding and vacuum forming equipment. They may also be extruded into articles with complex shapes, as well as rods or tubing. They may be calendered as free films or applied to fabrics and other substrates.

The thermoplastic polyurethanes prepared by the process of this invention may be blended with thermosetting phenol/formaldehyde resins. Solvent cements made of such blends are excellent adhesives for bonding a variety of surfaces. For example, a blend of equal parts of the thermoplastic polyurethane for Example 2 and a heat-advancing phenol/formaldehyde resin available as "Durez" 21582 phenolic resin from Hooker Chemical Corporation dissolved in a 90/10 methylene chloride/ethanol solvent is brushed onto two aluminum surfaces to give a film of 5 mil. thickness after evaporation of the solvent. After the coating is thoroughly dry the two surfaces are placed together and heated at 175° C. under pressure to cure the assembly. The bond shows a 180° shear strength of about 3200 lbs. per square inch at room temperature.

The following examples will better illustrate the nature of the present invention; however, the invention is not intended to be limited to these examples. Parts are by weight unless otherwise indicated.

PHYSICAL TESTING PROCEDURES

Unless otherwise shown, the following ASTM methods were used in testing the polymers of the examples:

| Test: | ASTM designation |
|---|---|
| Hardness (Durometer A) | D-676-59T |
| Resilience | D-945-59 |
| Compression set (Method B) | D-395-61 |
| Stress-strain | D-142-61T |

Example 1

Preparation of control polyurethane. To 220 ml. of methylene chloride at about 25° C. in a one-quart liquefier-blender there is added with rapid stirring a mixture of 25.0 gm. (.0222 mole) of the bischloroformate of polytetramethyleneether glycol of average molecular weight 1000, and 9.95 gm. (.0444 mole) of the bischloroformate of 1,4-butanediol. To the stirring mixture there is rapidly added a freshly prepared slurry of 6.03 gm. (.070 mole) of anhydrous piperazine in 50 ml. of methylene chloride. After reacting for one minute with agitation, 120 ml. of a 9.1% by weight aqueous solution of sodium carbonate is added, agitation is continued for four minutes and stopped. The reaction mixture is held for sixteen minutes and then 0.25 gm. of 4,4'-butylidene bis(2-t-butyl-5-methylphenol) is stirred in. Agitation is resumed while steam or hot water is introduced into the blender to volatize the methylene chloride. The coagulating-polymer is thus chopped into a crumb. After washing three or four times with hot water, the crumb is filtered off and dried overnight at 110° C. in a vacuum oven under nitrogen.

Example 2

To 200 ml. methylene chloride at about 25° C. in a 1-qt. liquefier-blender, there is added 20.0 g. (0.0222 mole) of the bischloroformate of polytetramethyleneether glycol of average molecular weight 1000. To the rapidly stirring mixture there is added over the course of 3 or 4 seconds a freshly prepared slurry of 2.86 g. (0.0333 mole) of anhydrous piperazine in 25 ml. of methylene chloride. Rapid agitation is continued for one minute, at which time 9.95 g. (0.0444 mole) of the bischloroformate of 1,4-butanediol is added, followed after 10 seconds by 3.17 g. (0.0367 mole) piperazine in 25 cc. methylene chloride. After one minute additional rapid agitation, 120 ml. of a 9.1% by weight aqueous solution of sodium carbonate is added. Agitation is continued for four minutes and stopped. The reaction mixture is held for sixteen additional minutes and then 0.25 g. 4,4'-butylidene bis-(2-t-butyl-5-methyl-phenol) is stirred in. Agitation is resumed while steam or hot water is introduced into the blender to volatilize the methylene chloride. The coagulating polymer is thus chopped into a crumb. After washing three or four times with hot water, the crumb is filtered off and dried overnight at 110° C. in a vacuum oven under nitrogen.

Examples 3–4

The procedure of Example 2 is followed, but the amount of piperazine reacted with the polytetramethyleneether glycol in the initial reaction step is varied as shown.

FIRST STEP

| Ex. No. | Bischloroformate of Polytetramethyleneether Glycol | | Piperazine | |
| --- | --- | --- | --- | --- |
| | Weight (gm.) | Moles | Weight (gm.) | Moles |
| 3 | 25 | .0222 | 3.34 | .039 |
| 4 | 25 | .0222 | 3.81 | .044 |

SECOND STEP

| Ex. No. | Bischloroformate of 1,4-Butanediol | | Piperazine | |
| --- | --- | --- | --- | --- |
| | Weight gm. | Moles | Weight (gm.) | Moles |
| 3 | 9.95 | .0444 | 2.69 | .031 |
| 4 | 9.95 | .0444 | 2.22 | .026 |

The polymers of Examples 1 to 4 are molded by conventional compression molding techniques into specimens which are appropriate for use in the designated tests. The specimens are formed under pressure in about 5 minutes at about 200° C. followed by cooling under pressure to about 30° C. before removal from the mold.

PHYSICAL TESTS

| | Example No. | | | |
| --- | --- | --- | --- | --- |
| | 1 (control) | 2 | 3 | 4 |
| Hardness | 81 | 78 | 67 | 68 |
| Resilience at 100° C | 71 | 73 | 69 | 63 |
| Compression set 22 hours at 70° C | 57 | 31 | 30 | 31 |
| Stress-strain properties at 25° C.: | | | | |
| Stress at 300% elongation, p.s.i. | 1,000 | 975 | 875 | 675 |
| Tensile strength, p.s.i. | 5,800 | 5,900 | 5,700 | 4,225 |
| Elongation at break, percent | 800 | 815 | 780 | 805 |

Example 5

Preparation of control polyurethane. To 350 ml. of methylene chloride in a one-quart liquefier-blender there is rapidly added at 25° C. with stirring 42.5 gm. (.02 mole) of the bischloroformate of polytetramethyleneether glycol of average molecular weight 2000, 8.6 gm. (.04 mole) of the bischloroformate of 1,4-butanediol, and a mixture of 5.68 gm. (.066 mole) of piperazine, and 9.5 gm. (.090 mole) of sodium carbonate dissolved in 95.6 gm. of water. Agitation is continued for four minutes and stopped. The reaction mixture is held for sixteen minutes and then 0.5 gm. of di-$\beta$-naphthyl-p-phenylenediamine is stirred in. Isolation and drying of the polymer is carried out according to the procedure of Example 1.

Example 6

To a stirring mixture of 350 ml. of methylene chloride and 42.5 gm. (.02 mole) of the bischloroformate of polytetramethyleneether glycol of average molecular weight 2000, in a one-quart liquefier-blender there is added at 25° C., 2.58 gm. (.03 mole) of piperazine dissolved in 14.6 gm. of water. After two minutes reaction there is added 8.6 gm. (.04 mole) of the bischloroformate of 1,4-butanediol, followed by a solution of 3.1 gm. (.036 mole) of piperazine, and 9.5 gm. (.090 mole) of sodium carbonate in 81 gm. of water. After four minutes additional reaction, agitation is stopped. The reaction mixture is held for sixteen minutes and then 0.5 gm. of di-$\beta$-naphthyl-p-phenylenediamine is stirred in. Isolation and drying of the polymer is carried out according to the procedure of Example 1.

The polymers of Examples 5 and 6 are molded by conventional compression molding techniques in accordance with the procedure used for the polymers of Examples 1 to 4.

PHYSICAL TESTS

| | Example No. | |
| --- | --- | --- |
| | 5 | 6 |
| Hardness | 69 | 68 |
| Compression set 22 hours at 70° C | 47 | 28 |
| Stress-strain properties at 25° C.: | | |
| Stress at 300% elongation, p.s.i. | 650 | 670 |
| Tensile strength, p.s.i. | 6,300 | 6,500 |
| Elongation at break, percent | 710 | 710 |

Example 7

Preparation of control polyurethane. To 220 ml. of methylene chloride in a one-quart liquefier-blender there is rapidly added at about 25° C. with stirring 34.35 gm. (.03 mole) of the bischloroformate of polypropyleneether glycol of average molecular weight 1000, 12.90 gm. (.66 mole) of the bischloroformate of 1,4-butanediol, and 8.13 gm. (.0945 mole) of piperazine as a 15% aqueous solution. After 1 minute 15.9 gm. of sodium carbonate is added as a 9.1% aqueous solution and agitation is continued for four additional minutes and stopped. The reaction mixture is held for sixteen minutes and then 0.5 gm. of di-$\beta$-naphthyl-p-phenylenediamine is stirred in. Isolation and drying of the polymer is carried out according to the procedure of Example 1.

Example 8

To a stirring mixture of 220 ml. of methylene chloride and 34.35 gm. (.03 mole) of the bischloroformate of polypropyleneether glycol of average molecular weight 1000 in a one-quart liquefier-blender, there is added at about 25° C., 4.52 gm. (.0525 mole) of piperazine as a 15% aqueous solution. After one minute of reaction, 12.90 gm. (.06 mole) of the bischloroformate of 1,4-butanediol is introduced, followed by a solution of 3.61 gm. (.042 mole) of piperazine and 15.9 gm. (.150 mole) of sodium carbonate in 180 ml. of water. Agitation is continued for four additional minutes and stopped. The reaction mixture is held for sixteen minutes and then 0.5 gm. of di-$\beta$-naphthyl-p-phenylenediamine is stirred in. Isolation and drying of the polymer is carried out according to the procedure of Example 1.

The polymers of Examples 7 and 8 are molded by conventional molding techniques in accordance with the procedure used for the polymers of Examples 1 to 4.

PHYSICAL TESTS

| | Example No. | |
| --- | --- | --- |
| | 7 | 8 |
| Hardness | 80 | 70 |
| Resilience at 100° C | 63 | 73 |
| Compression set 22 hours at 70° C | 61 | 33 |

Example 9

To a 1-quart liquefier-blender there is added with stirring 400 cc. methylene chloride, 33.75 grams (.03 mole) of the bischloroformate of polytetramethyleneether glycol of molecular weight about 1000 and 2.56 grams (.030 mole) of piperazine. The mixture is stirred two minutes, and 23.7 cc. of a 9.1% aqueous sodium carbonate solution (.0225 mole sodium carbonate) is added. Stirring is continued for two minutes longer, and 12.9 grams (.06 mole) of the bischloroformate of 1,4-butanediol is added and allowed to stir in for a few seconds to effect uniformity. Finally, there is added 5.955 grams (.069 mole) of piperazine in 138 cc. of a 9.1% sodium carbonate solution and after stirring for 4 minutes, there is incorporated 0.5 gram di-$\beta$-naphthyl-p-phenylenediamine. The polymer is isolated as in Example 1. The polymer is molded according to the procedure of Examples 1 to 4.

Hardness _____ 75
Resilience, 100° C. _____ 65
Compression set 22 hours at 70° C. _____ 29

Stress-strain properties at 25° C.:
    Stress at 300% elongation, p.s.i. _____ 900
    Tensile strength, p.s.i. _____ 5300
    Elongation at break, percent _____ 830

Example 10

Preparation of control polyurethane for Example 11. To 302 cc. of methylene chloride in a 1-quart liquefier blender there is added 28.95 grams (.02645 mole) of the bischloroformate of polytetramethyleneether glycol of average molecular weight about 1000, and 2.845 grams (.01322 mole) of the bischloroformate of 1,4-butanediol. Stirring is started and there is added an aqueous solution comprising 3.76 grams (.04365 mole) of piperazine, 5.86 grams (.0553 mole) of sodium carbonate, and 107 grams of water. Agitation is continued for 4 minutes and 0.30 gram di-β-naphthyl-p-phenylene diamine is stirred in. The polymer is isolated according to the procedure of Example 1.

The polymer flows under its own weight at 110° C. and when it is stretched for a short time at 25° C. and released, it shows substantially no recovery.

Example 11

To a stirring mixture of 302 cc. methylene chloride and 28.95 grams (.02645 mole) of the bischloroformate of polytetramethyleneether glycol of molecular weight about 1000 in a 1-quart liquefier blender there is added 3.76 grams (.04365 mole) of piperazine as a 10% aqueous solution. Vigorous stirring is continued for two minutes. The bischloroformate of 1,4-butanediol, 2,845 grams (.01322 mole) is added, and after a few seconds stirring, this is followed by 68.7 cc. of an aqueous solution containing 5.86 grams (.0553 mole) of sodium carbonate. Vigorous stirring is continued for 4 minutes longer after which 0.3 gram di-β-naphthyl-p-phenylene diamine is stirred in and the polymer is isolated as in Example 1.

The polymer is molded into suitable test pieces under pressure for about 5 minutes at about 170° C. and cooled under pressure to about 30° C. before removal from the mold. It does not flow under its own weight at 110° C.

Hardness _____ 46
Compression set 22 hours at 25° C., percent ____ 42
Stress-strain properties at 25° C.:
    Stress at 300% elongation, p.s.i. _____ 215
    Tensile strength, p.s.i. _____ 2850
    Elongation at break, percent _____ >1000

Example 12

Preparation of control elastomer for Example 13. The procedure of Example 10 is followed, except that 3.57 grams (.01322 mole) of the bischloroformate of 1,4-dimethylolcyclohexane is used in place of the bischloroformate of 1,4-butanediol. The polymer flows under its own weight during drying at 100°–110° C.

Example 13

The procedure of Example 11 is followed, except that .01322 mole (3.57 grams) of the bischloroformate of 1,4-dimethylolcyclohexane is used in place of the bischloroformate of 1,4-butanediol.

The polymer is formed into suitable test pieces using the molding conditions of Example 11, and then tested.

PHYSICAL PROPERTIES

Hardness _____ 52
Compression set 22 hrs. at 25° C., percent _____ 36
Stress-strain properties at 25° C.:
    Stress at 300% elongation, p.s.i. _____ 310
    Tensile strength, p.s.i. _____ 3250
    Elongation at break, percent _____ 1100
    Set at break, percent _____ 60

Example 14

Preparation of control polyurethane. To 225 ml. of methylene chloride at about 25° C. in a one-quart liquefier-blender there is added with rapid stirring 33.8 gm. (0.03 mole) of the bischloroformate of polytetramethyleneether glycol of average molecular weight 1000, 6.85 gm. (0.3 mole) of the bischloroformate of neopentyl glycol, 12.9 gm. (.06 mole) of the bischloroformate of 1,4-butanediol, and 10.85 gm. (.126 mole) of piperazine as a 15% aqueous solution. After reacting for one minute with agitation, 20.4 gm. (.192 mole) of sodium carbonate is added in about 200 ml. of water. Agitation is continued for four minutes and stopped. The reaction mixture is held for sixteen minutes and then 0.5 gm. of di-β-naphthyl-p-phenylene diamine is stirred in. Isolation and drying of the polymer is carried out according to the procedure of Example 1.

Example 15

To a stirring mixture of 225 ml. of methylene chloride, 33.8 gm. (.03 mole) of the bischloroformate of polytetramethyleneether glycol of average molecular weight 1000, and 6.85 gm. (.03 mole) of the bischloroformate of neopentyl glycol, in a one-quart liquefier-blender there is added at about 25° C. 9.05 gm. (.1050 mole) of piperazine as a 15% aqueous solution. After one minute of reaction there is added 12.9 gm. (.06 mole) of the bischloroformate of 1,4-butanediol followed by 1.81 gm. (.021 mole) of piperazine and 20.4 gm. (.192 mole) of sodium carbonate as about a 10% aqueous solution. Agitation is continued for four minutes and stopped. The reaction mixture is held for sixteen minutes and then treated according to the procedure of Example 14.

The polymers of Examples 14 and 15 are molded by conventional compression molding techniques into specimens which are appropriate for use in the designated tests. The specimens are formed under pressure in about 5 minutes at about 200° C. followed by cooling under pressure to about 30° C. before removal from the mold.

PHYSICAL TESTS

|  | Example No. | |
| --- | --- | --- |
|  | 14 | 15 |
| Hardness | 72 | 77 |
| Resilience at 100° C | 29 | 68 |
| Compression set 22 hours at 70° C | 78 | 35 |
| Compression set 22 hours at 121° C.[1] | | 63 |
| Stress-strain properties at 25° C.: | | |
| Stress at 300% elongation, p.s.i. | 740 | 850 |
| Tensile strength at break, p.s.i. | 4,200 | 5,000 |
| Elongation at break, percent | 720 | 705 |

[1] Test specimens were preconditioned at 135° to 140° C. for 6 hours before testing, during which time the polymer of Example 14 melted.

As many widely different embodiments of this invention may be made without departing from the spirit and scope thereof, it is to be understood that this invention is not limited to the specific embodiments thereof except as defined in the appended claims.

What is claimed is:

1. In the process for preparing a thermoplastic polyurethane polymer from a bischloroformate of a polyalkyleneether glycol, said polyalkyleneether glycol having a molecular weight between about 1000 and 2000, a bischloroformate of a low molecular weight glycol, said low molecular weight glycol having a molecular weight below about 200, and 1–1.1 equivalents per equivalent of said bischloroformate used of an organic secondary diamine selected from the group consisting of piperazine and 2,5-dimethylpiperazine, with the bischloroformate of said polyalkyleneether glycol being used in a molar ratio with the bischloroformate of said low molecular weight glycol of from about 1:3 to about 1:0.5 the improvement comprising (1) reacting one mole of the bischloroformate of said polyalkyleneether glycol with from about 1 to 2 moles of said organic secondary diamine, followed by (2) reacting the polyurethane polymer resulting from step (1) with the bischloroformate of said low molecular weight glycol and the remaining portion of the organic diamine used.

2. The process of claim 1 wherein an inorganic acid acceptor is employed in step (2).

3. The process of claim 1 wherein the polyalkyleneether glycol is a polytetramethyleneether glycol, the organic diamine is piperazine and the low molecular weight glycol is 1,4-butanediol.

4. The process of claim 1 wherein the polyalkyleneether glycol is a polypropyleneether glycol, the organic diamine is piperazine and the low molecular weight glycol is 1,4-butanediol.

5. In the process for preparing a thermoplastic polyurethane polymer from a bischloroformate of a polyalkyleneether glycol, said polyalkyleneether glycol having a molecular weight between about 1000 and 2000, a bischloroformate of a low molecular weight glycol, said low molecular weight glycol having a molecular weight below about 200, and 1–1.1 equivalents per equivalent of said bischloroformates used of an organic secondary diamine selected from the group consisting of piperazine and 2,5-dimethylpiperazine, with the bischloroformate of said polyalkyleneether glycol being used in a molar ratio with the bischloroformate of said low molecular weight glycol of from about 1:3 to about 1:0.5, the improvement comprising (1) reacting about one mole of the bischloroformate of said low molecular weight glycol with from about 1 to 2 moles of said organic secondary diamine, followed by (2) reacting the polyurethane polymer from step (1) with the bischloroformate of said polyalkyleneether glycol and the remaining portion of the organic diamine used.

6. In the process for preparing a thermoplastic polyurethane polymer from (a) a bischloroformate of a polyalkyleneether glycol, said polyalkyleneether glycol having a molecular weight between about 1000 and 2000, (b) a bischloroformate of a low molecular weight glycol, said low molecular weight glycol having a molecular weight below about 200, and (c) 1–1.1 equivalents per equivalent of said bischloroformates used of an organic secondary diamine selected from the group consisting of piperazine and 2,5-dimethylpiperazine, said bischloroformate of said polyalkyleneether glycol being used in a molar ratio with the bischloroformate of said low molecular weight glycol of from about 1:3 to about 1:0.5, the improvement comprising (1) reacting a first bischloroformate portion consisting essentially of one mole of the bischloroformate of said polyalkyleneether glycol plus up to about 40% of the bischloroformate of said low molecular weight glycol with from about 1–2 moles of said organic secondary diamine, followed by (2) reacting the resulting polyurethane polymer with a second bischloroformate portion consisting essentially of the remaining portion of the bischloroformate of said low molecular weight glycol not used in step (1) and the remainder of the secondary organic diamine used.

References Cited

UNITED STATES PATENTS

| 2,808,391 | 10/1957 | Pattison | 260—77.5 |
| 2,929,800 | 3/1960 | Hill | 260—77.5 |
| 2,929,802 | 3/1960 | Katz | 260—77.5 |
| 2,970,987 | 2/1961 | Wittbecker | 260—77.5 |

FOREIGN PATENTS

| 685,729 | 1/1953 | Great Britain. |
| 1,061,071 | 7/1949 | Germany. |

DONALD E. CZAJA, *Primary Examiner.*

F. McKELVEY, *Assistant Examiner.*